(12) United States Patent
Karuppaswamy

(10) Patent No.: US 7,469,948 B2
(45) Date of Patent: Dec. 30, 2008

(54) APPARATUS FOR EXTENDING VEHICLE CARGO SPACE AND METHOD FOR SAME

(75) Inventor: Senthil N. Karuppaswamy, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/746,112

(22) Filed: May 9, 2007

(65) Prior Publication Data
US 2008/0277956 A1    Nov. 13, 2008

(51) Int. Cl.
*B60P 3/34* (2006.01)
(52) U.S. Cl. ............................... 296/26.08; 296/26.01
(58) Field of Classification Search ............. 296/26.08, 296/146.1, 50, 37.16, 26.01
See application file for complete search history.

(56) References Cited

U.S. PATENT DOCUMENTS

| | | | | |
|---|---|---|---|---|
| 3,806,183 A | * | 4/1974 | Sieren et al. | 296/37.16 |
| 3,888,539 A | * | 6/1975 | Niessner | 296/26.09 |
| 4,065,166 A | * | 12/1977 | Shoemaker | 296/26.01 |
| 4,133,573 A | * | 1/1979 | Zur | 296/26.06 |
| 4,159,141 A | * | 6/1979 | Dirck | 296/50 |
| 4,639,031 A | * | 1/1987 | Truckenbrodt | 296/24.41 |
| 4,756,457 A | * | 7/1988 | Polk | 224/509 |
| 5,007,670 A | * | 4/1991 | Wise | 296/39.1 |
| 5,491,875 A | * | 2/1996 | Siladke et al. | 296/146.12 |
| 5,803,524 A | * | 9/1998 | McCammon | 296/39.1 |
| 5,842,770 A | * | 12/1998 | Gold | 362/487 |
| 6,231,096 B1 | * | 5/2001 | Bollmann et al. | 296/37.16 |

* cited by examiner

*Primary Examiner*—Kiran B. Patel

(57) ABSTRACT

An apparatus is provided that offers a flexible amount of vehicle cargo space, allowing a vehicle user the option of additional vehicle cargo space when needed. A first member is operatively connected to the vehicle door, is nestable within a door cavity within the door, and is selectively movable to an extended position for partially defining an exterior cargo space. Preferably, a second member is substantially nested within an additional cavity formed in the first member and is selectively movable to an extended position for partially enclosing the exterior cargo space. Preferably, a second vehicle door substantially identical and adjacent to the first vehicle door includes members substantially identical to the first and second members postionable to define, along with the first and second members and the doors, the exterior cargo space. A method for achieving this flexible cargo space is also provided.

6 Claims, 2 Drawing Sheets

APPARATUS FOR EXTENDING VEHICLE CARGO SPACE AND METHOD FOR SAME

TECHNICAL FIELD

The invention relates to an apparatus for extending cargo space of a vehicle and a method therefore; specifically, to a vehicle door having at least one nested pivotable member that partially forms an exterior cargo space to extend an interior cargo space defined by the vehicle body.

BACKGROUND OF THE INVENTION

There are many occasions on which a vehicle owner may desire additional cargo space, such as for transporting luggage, furniture, camping gear, or picnic items such as coolers. Commercial vehicles may also require additional cargo space for certain uses. However, because the majority of the time a lesser, fixed interior cargo space may adequately serve the customers needs, many customers may choose not to purchase a vehicle with greater cargo space, for the limited instances when extra cargo space is desired.

SUMMARY OF THE INVENTION

An apparatus is provided that offers a flexible amount of vehicle cargo space, allowing a vehicle user the option of additional vehicle cargo space when needed. A method for achieving this flexible cargo space is also achieved. Specifically, the apparatus includes a vehicle door that has a door cavity on an interior side. The vehicle door is configured to be connected to a vehicle body. A first member, which may be a panel member, a wall member, or any other generally planar structural member is substantially nested within the door cavity in a stowed position, and therefore takes up little or none of the interior cargo space defined by the vehicle body when in the stowed position, because of the nesting arrangement. The first member is operatively connected to the vehicle door, such as by a hinge, and is selectively movable to an extended position substantially perpendicular to the vehicle door for partially defining an exterior cargo space when the vehicle door is connected to the vehicle body and is in the open position. The first member serves as a floor portion of the exterior cargo space and is substantially coplanar with the floor of the vehicle when in the extended position. Preferably, a second member is substantially nested within an additional cavity formed in the first member and is selectively movable to an extended position substantially perpendicular to the first member and to the vehicle door for partially enclosing the exterior cargo space. The second member may be referred to as a rear closure member. Because the members are nested in the door when not in use, the cargo space extending apparatus does not occupy any interior cargo space.

Preferably, a second vehicle door is adjacent the first vehicle door, with the doors arranged as swing-out style rear doors, as are frequently offered on sport utility vehicles and cargo vans, pivotable about substantially vertical axes such that the interior sides of the pair of doors face one another when both are in an open position. The second vehicle door also has a door cavity on an interior side thereof with a third member like the first member nested within the door cavity of the second door and a second member like the fourth member nested within a cavity formed in the third member. The first and second doors and extended first, second, third and fourth members define the exterior cargo space when connected to the vehicle body with the first, second, third and fourth members in respective extended positions.

Preferably, the second member has a handle that may be used as an aid in pivoting the second member to an extended position with respect to the first member. The fourth member may have a similar handle. Locking mechanisms, such as slide bolts, may be utilized to secure the extended second member to the open vehicle door, the first member to the vehicle body, and the second member to the adjacent fourth member. The third and fourth members connected to the second vehicle door preferably have like locking mechanisms. The doors may be equipped with optional tie-down mechanisms to secure a roof cover, such as a tarp, to substantially cover the exterior cargo space.

Accordingly, a method of extending vehicle cargo space includes nesting one or more members within each of first and second openable and closable vehicle doors, opening the vehicle doors and then pivoting the members to respective extended positions substantially perpendicular to the doors to define an exterior cargo space that is positioned to serve as an extension of interior cargo space on the vehicle.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
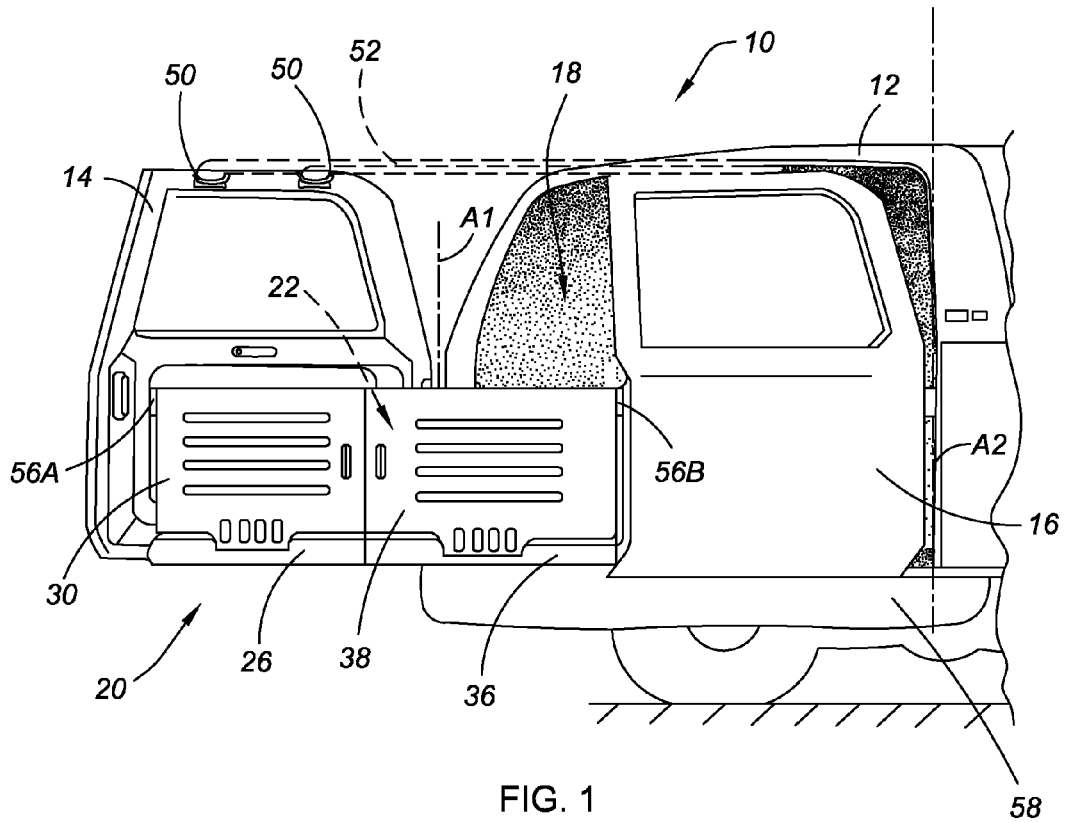
FIG. 1 is a schematic perspective illustration in partial fragmentary view of a vehicle with a vehicle body defining an interior cargo space, two vehicle doors connected thereto in open positions with extended members locked to one another to define an exterior cargo space serving as an extension of the interior cargo space.

Referring to the drawings, wherein like reference numbers refer to like components, FIG. 1 shows a vehicle 10 including a vehicle body 12 with a first door 14 and a second door 16 pivotably attached thereto with hinges to move between respective closed positions and open positions (shown) by pivoting about respective vertical axes A1 and A2, as is known. (Although the closed positions are not shown, the doors 14 and 16 would be rotated approximately 90 degrees inward toward an interior cargo space 18 formed and defined by the vehicle body 12.)

Figure 2:
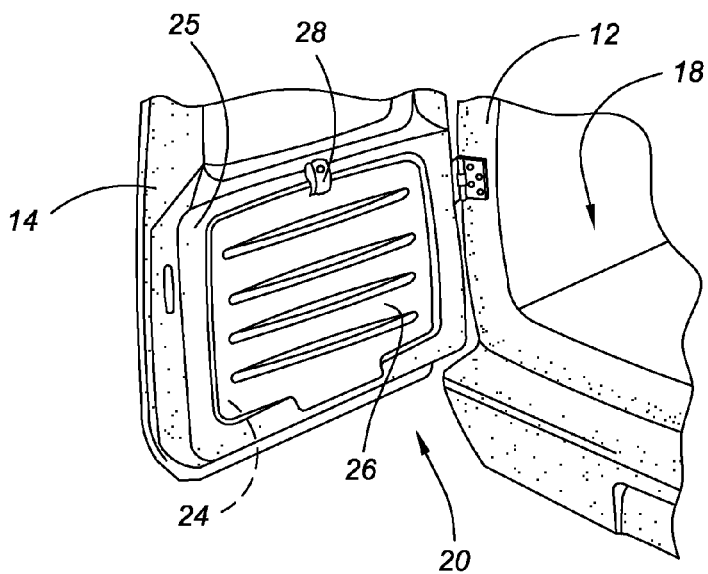
FIG. 2 is a schematic perspective illustration in partial fragmentary view of the left vehicle door of FIG. 1, with the members nested in a cavity of the door in a stowed position.
Figure 3:
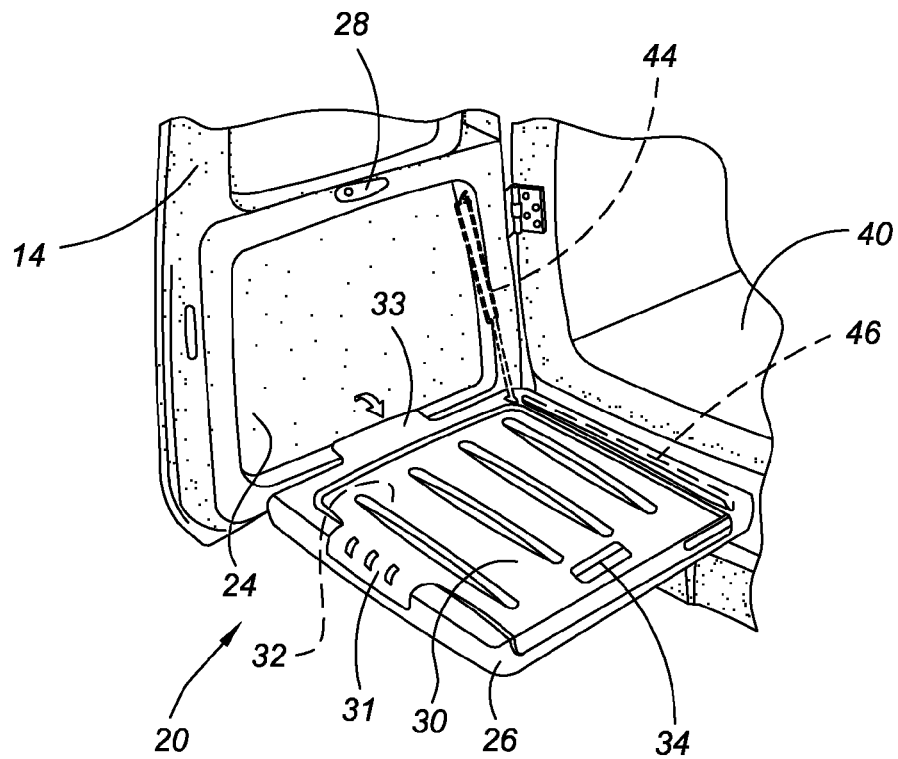
FIG. 3 is a schematic perspective illustration in partial fragmentary view of the vehicle door of FIG. 2, with the members pivoted out of the door cavity.
Figure 4:
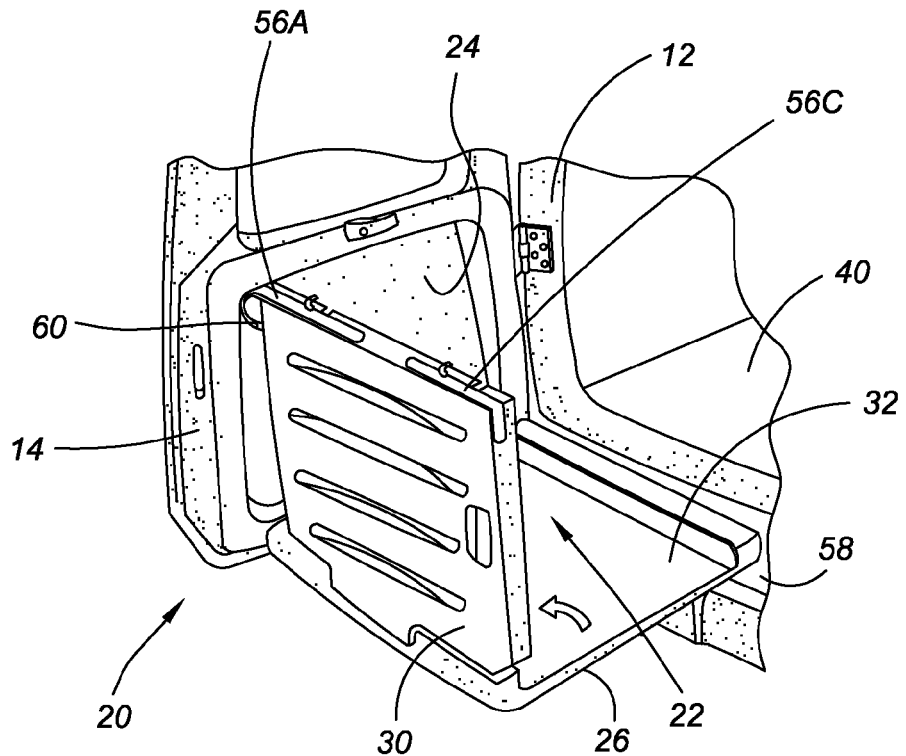
FIG. 4 is a schematic perspective illustration in partial fragmentary view of the vehicle door of FIGS. 2 and 3, with a second of the members pivoted out of a cavity formed in the first of the members and then locked to the door to partially define the exterior cargo space.

A vehicle space cargo extending apparatus 20, which includes the doors 14 and 16, is shown defining an exterior cargo space 22 which extends rearward of the vehicle 10 and complements the interior cargo space 18 to allow transport of more cargo. FIGS. 2 through 4 illustrate the vehicle cargo extending apparatus 20 and the method by which the vehicle cargo space is extended.

Referring to FIG. 2, the first door 14 is shown hingedly connected to the vehicle body 12 in an open position. The first door 14 is formed with a door cavity 24, also referred to as a trim cavity, on an interior side 25 thereof, in which other components of the vehicle cargo extending apparatus 20 are nested. An outermost member, which may be referred to as a first member 26, is a substantially planar component hinged to the first door 14 at a lower end and held in a closed, nested or stowed position in the door cavity 24 by a latch 28. If the latch 28 is rotated 90 degrees counter-clockwise, as shown in FIGS. 3 and 4, the first member 26 is pivotable downward, as indicated by the arrow, to an extended position, approximately perpendicular to the door 14, such that the first member 26 is no longer nested within the door cavity 24. With the first member 26 in the extended position, a second member 30 is visible nested within an additional cavity 32 formed or otherwise provided in the first member 26. The second member 30 is hingedly connected to the first member 26, with the hinge 31 at a rearward side thereof, 90 degrees offset from the hinge 33 connecting the first member 26 to the door 14. When the first member 26 is in the nested position shown in FIG. 2, the second member 30 is also nested within the door cavity 24, although not visible in FIG. 2. Both of the first and second members 26, 30 are included in the vehicle cargo extending apparatus 20. By extending the first member 26 as shown in FIG. 3, and then extending the second member 30 to a substantially upright position, as indicated by the arrow in FIG. 4, approximately perpendicular to both the door 14 and the first member 26, a portion of the exterior vehicle cargo space 22 is thereby formed and defined. The first member 26 forms a floor portion of the exterior cargo space 22, and may be referred to as a floor extension member. The second member 30 encloses the exterior cargo space 22 from the rear, and may be referred to as a rear closure member. A handle 34 is provided in the second member 30 to aid in lifting the second member 30 from the nested position of FIG. 3 to the extended position of FIG. 4.

It should be appreciated that the second vehicle door 16 is symmetrical to the first door 14 and includes a third member 36 and a fourth member 38 identical to the first and second members 26, 30, respectively, and packaged in a like door cavity (not shown, but identical to door cavity 24) in door 16. When all of the members 26, 30, 36 and 38 are extended, as shown in FIG. 1, the exterior cargo space 22 is formed. The exterior cargo space 22 is positioned to complement the interior cargo space 18, with the first and third members 26 and 36 substantially co-planar with a floor 40 of the vehicle body 12 and the second and fourth members 30 and 38 serving to enclose the exterior cargo space 22 from the rear, as indicated in FIG. 1. Thus, the third member 36 also forms a floor portion of the exterior cargo space 22 and may be referred to as a floor extension member, and the fourth member 38 may be referred to as a rear closure member. Preferably, the members 26, 30, 36, 38 are structural plastic, and may be corrugated or ribbed to enhance load-bearing capabilities.

The cargo extending apparatus 20 includes many additional features. For example, referring again to FIG. 3, a gas or pneumatic spring 44 pivotably connected at one end to the first door 14 and at another end to the first member 26 assists in lowering and raising the first member 26 between the nested and extended positions. A slot 46 is formed in the first member 26 to partially contain the spring 44 when the first member 26 is in the nested position. The spring 44 and slot 46 are shown in phantom in FIG. 3, but are not shown in FIG. 4 for purposes of clarity in the drawing.

Additionally, the vehicle doors 14 and 16 may have one or more tie-down mechanisms 50 formed or otherwise attached thereto. The tie-down mechanism 50 may form partial rings when welded or otherwise attached to the respective doors 14, 16 so that a roof cover 52 may be secured through the tie-down mechanisms 50 to partially or completely cover the exterior cargo space 22, protecting cargo stored therein or sheltering persons using the exterior cargo space 22 for camping or other uses.

Locking mechanisms may be used to secure the second and fourth members 30, 38 to one another, to the doors 14 and 16, and to secure the first and third members 26, 36 to the vehicle body 12. Referring to FIG. 4, a locking mechanism 56A slides outward from the second member 30 toward the door cavity 24 to be secured in a recess 60 in the door cavity 24. The locking mechanism 56A is selectively slid inward, away from the door cavity 24, and may be secured flush within the second member 30 when the second member 30 is to be unlocked from the door 14. The fourth member 38 is provided with an identical locking member 56B (partially visible in FIG. 1) that is slidable to lock the fourth member 38 to the door 16 when in the extended position. Another locking mechanism 56C is contained within the second member 30, shown in a flush position in FIG. 4, but may be selectively slid outward (to the right in FIG. 4) to be received in an adjacent slot in fourth member 38 when both members 30 and 38 are in extended positions, as shown in FIG. 1 to lock the members 30, 38 to one another. Finally, the side of the first and third members 26, 36 adjacent to a bumper portion 58 of the vehicle body 12 may have locking mechanism similar to locking mechanisms 56A-56C that selectively lock the members 26, 36 to the vehicle body 12.

A method of extending vehicle cargo space utilizing the vehicle cargo extending apparatus 20 of FIGS. 1-4 includes nesting the members 26, 30 in the first vehicle door 14, nesting the members 36, 38 in the second vehicle door 16, opening the vehicle doors 14 and 16, and pivoting the members 26, 30, 36 and 38 to respective extended positions (shown in FIG. 1) to define an exterior cargo space 22 complementing the interior cargo space 18 of the vehicle body 12 to which the doors 14 and 16 are attached.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a vehicle body having a floor and defining an interior cargo space;
a first and a second vehicle door each pivotably connected to the vehicle body and pivotable about a respective substantially vertical axis between an open and a closed position; wherein each of the first and the second vehicle doors define a door cavity on an interior side thereof; wherein the respective door cavities face one another when both vehicle doors are in the open position;
a first and a second member both nestable in stowed positions within the door cavity of the first vehicle door; wherein the first member is connected to and pivotable with respect to the first vehicle door to an extended position substantially perpendicular to the first vehicle door and substantially level with the floor; wherein the second member is connected to and pivotable with respect to the first member to an extended position substantially perpendicular to the first member, to the first vehicle door and to the floor;
a third and a fourth member both nestable in stowed positions within the door cavity of the second vehicle door; wherein the third member is connected to and pivotable with respect to the second vehicle door to an extended position substantially perpendicular to the second vehicle door and substantially level with the floor; wherein the fourth member is connected to and pivotable with respect to the third member to an extended position substantially perpendicular to the third member, to the second vehicle door and to the floor; and wherein the extended first, second, third and fourth members and open first and second vehicle doors define an exterior cargo space positioned to serve as an extension of the interior cargo space.

2. The vehicle of claim 1, further comprising:

a plurality of locking mechanisms operable to lock the second member to the first vehicle door, the fourth member to the second vehicle door, and the second and fourth members to one another when the vehicle doors are in the respective open positions and the second and fourth members are in the respective extended positions.

3. The vehicle of claim 1, further comprising:

at least one tie-down mechanism connected to each of the vehicle doors, respectively, and operable for securing a removable roof cover to the vehicle doors to at least partially cover the exterior cargo space.

4. The apparatus of claim 1, wherein the first member and the third member are each formed with a respective additional cavity; and wherein the second member is nestable within the additional cavity of the first member and the fourth member is nestable within the additional cavity of the third member.

5. The apparatus of claim 1, further comprising:

respective handles connected to the second member and to the fourth member for moving the second and fourth members between respective nested positions within the respective additional cavities of the first and the third members, and respective extended positions.

6. The apparatus of claim 1, further comprising:

respective latches operable to selectively latch the first member and the third member in the respective stowed positions.

* * * * *